Figure 1:
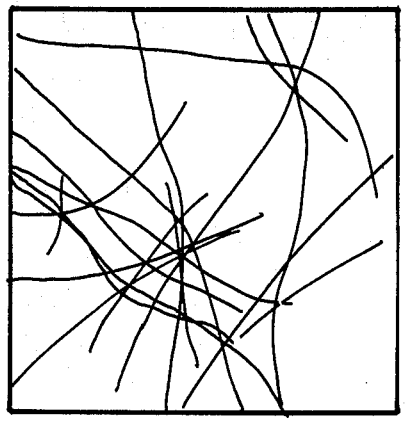

April 19, 1966     B. A. GRUBER     3,246,950

METHOD OF PREPARING FIBROUS SILICON CARBIDE

Filed Jan. 3, 1961

*INVENTOR.*
BERNARD A. GRUBER

BY Herman O. Bauermeister

ATTORNEY

United States Patent Office 3,246,950
Patented Apr. 19, 1966

---

3,246,950
METHOD OF PREPARING FIBROUS SILICON CARBIDE
Bernard A. Gruber, Dayton, Ohio, assignor to Monsanto Company, a corporation of Delaware
Filed Jan. 3, 1961, Ser. No. 80,402
9 Claims. (Cl. 23—208)

This application is a continuation-in-part of application Serial No. 803,176 filed March 31, 1959, now abandoned.

The present invention relates to a new composition of matter and to new and useful articles of manufacture derived therefrom. The invention also relates to a new process for the manufacture of the same.

The present invention is concerned with a fibrous form of silicon carbide as a new composition of matter. It is an object of the invention to prepare a high strength form of silicon carbide existing as discrete fibers which have utility in a number of relationships. It is also an object of the invention to prepare high strength articles of manufacture based upon the said fiber in combination with metals, ceramics or plastics in which the novel fibrous form of silicon carbide is employed as a reinforcing and hard surfacing component.

Another object of the invention is to manufacture refractory compositions based upon the new form of silicon carbide.

It is also an object of the invention to provide a method for the production of silicon carbide in the form of discrete fibers as well as in the form of composited and felted masses of the said fibrous silicon carbide. It is consequently another object of the invention to prepare insulating materials fabricated from the felted or bonded aggregation of the fibrous form of silicon carbide.

Another object of the invention is the preparation of an exceedingly pure variety of silicon carbide existing in a fibrous form. This type of silicon carbide is particularly useful in electrical and electronic applications because of its unusually high degree of purity, thus rendering the silicon carbide suitable for use in semiconductor applications.

It is also an object of the invention to prepare silicon carbide in a fibrous form by the reaction of silicon monoxide and carbon monoxide from the gas phase. The reaction product is deposited from the gas phase in discrete fibers and loose aggregations of the fibers.

Conventional silicon carbide as prepared in the electric furnace by the reaction of silicon carbide (such as sand) and carbon (utilized in the form of coke) is obtained in massive form, for example, as lumps ranging from a few inches to several feet in diameter. Such commercial silicon carbide crystallizes in an alpha-crystalline modification, although the beta form exists therewith in relatively minor proportions with the alpha-crystalline form.

While such commercial silicon carbide is well known as a high temperature refractory, it is limited in application as a high temperature insulating material because of its relatively good thermal conductivity. It has also been found that a disadvantage of commercial silicon carbide in electronic uses is that purity which can be achieved in the production of silicon carbide from silicon and carbon is quite limited. It is therefore impossible by conventional methods to obtain a semiconductor grade of silicon carbide. The high density which is characteristic of electric furnace silicon carbide is also disadvantageous in many relationships where weight limitations are critical.

It has now been found that an entirely new form of silicon carbide existing in a beta crystalline modification and characterized by a fibrous structure may be obtained by the reaction of silicon monoxide and carbon monoxide in the gas phase. The product thus obtained is consequently not sublimed from a solid phase but is formed directly by precipitation from the gas phase to yield the desired fibers. This product exists in fibers having a diameter of from 50 angstroms to 10,000,000,000 angstroms and varying in length from quite short fibers (e.g. 250 angstroms) to lengths as great as 2,500,000,000,000 angstroms, e.g. about 1 inch maximum length for the fibers which look like single hairs. In general, the length to diameter ratio of the present silicon carbide fibers may vary over a wide range such as from 5:1 to 50,000,000,000:1 and even more. It is unusual for an inorganic crystalline material to build up continuous fibers, particularly in the length-diameter ratios as high as those which have been observed in the present work.

The silicon monoxide which is employed in the present gas phase reaction may be obtained by conventional means such as the preliminary reaction of elemental silicon with carbon monoxide, or by the reduction of silicon dioxide to obtain the monoxide. The gaseous silicon monoxide is then reacted in the vapor phase with gaseous carbon monoxide to form silicon carbide which crystallizes in the form of fibers. In order to direct the reaction towards the production of the desired product, it has been found necessary to operate within the temperature range of from 1,100° C. to 2,200° C., a preferred temperature range being from 1,300° C. to 1,600° C. The collection temperature is not critical, although it is preferred that a cooler region be available, e.g., at 400° C. to 1,500° C. as a collection zone. However, fibers are also condensed or deposited in the high temperature reaction zone at temperatures of the order of 1,500° C. to 1,600° C.

The stoichiometric proportions of gaseous SiO and CO utilized in the reaction are 3 moles of silicon monoxide, SiO, to 1 mole of carbon monoxide, CO. However, it has been found essential in the present process in order to obtain high yields of the fibrous product to have an excess of CO present relative to the SiO. A preferred range of proportions is from 25% to 99.99% by volume of CO present in 100 parts by volume of the gaseous reactants. If an inert gas is desired as a diluent, for example, argon or helium, the above proportions between the SiO and CO are still maintained. When an inert gas is used, for example, as a carrier medium to introduce the gaseous SiO into the reaction system, the proportion of the inert gas is not critical, and may vary widely, such as from 5% to 99.9% by volume relative to the SiO and CO which are the reacting gases. The total pressure on the system is not critical and may range from vacuum conditions, for example, 0.10 atmosphere to superatmospheric conditions, e.g., as much as 100 p.s.i. Thus, when operating at 1,327° C., the partial pressure of the carbon monoxide is 756.7 mm. and the partial pressure of the silicon monoxide is 3.3 mm. when utilizing 1 atmosphere (actual pressure 760 mm.) total pressure. The residence time in a flow system is not critical; it has been found that fibers are obtained at residence time of 0.01 second and also at 1000 seconds.

The fibers of silicon carbide obtained by the method described above are exceedingly pure because of the crystallization from the vapor phase which apparently results in a selective purification with the elimination of otherwise common impurities. The fibers have been found to be easily obtainable with a purity such that there is less than 0.01 p.p.m. total impurities present. For this reason the present fibrous form of silicon carbide is a useful starting material in the conventional sublimation process of preparing an ultra-pure material. However, the sublimate thus produced has been found not to have a fibrous structure. The color of the fibers range from white through gray to black. When the fiber diameters are of the order of the wavelengths of visible light, the color is white.

The product obtained by the primary reaction of silicon monoxide with carbon monoxide is a pure fibrous material which may contain some spherical particles of silicon dioxide as an impurity. For example, the silicon carbide may range from 40% to 99% by weight, although 100% SiC is also common. For many purposes such technical grade mixtures are eminently satisfactory, for example, as medium temperature insulating compositions which are useful, for example, in the range of from 500° C. to 1,400° C. However, if it is desired to obtain a very pure form of silicon carbide free from the microspheres of silicon dioxide, it has been found that the silicon dioxide is readily removed by washing the product with hydrofluoric acid. This acid may be used in any convenient concentration, for example, from 5% to 100% HF. Thus, the laboratory grade of acid having a concentration of 50% in water may readily be employed, although the technical grade which has an analysis of 25% HF is equally satisfactory. Hydrogen fluoride gas (100% HF) is also applicable in this relationship, since the resultant reaction product of silicon dioxide with HF is silicon tetrafluoride which is volatilized as a gas. The hydrogen fluoride treatment may also be supplemented by the use of nitric acid, either as a separate treatment using any desired concentration, for example, 5% to 100% $HNO_3$. Mixtures of nitric and hydrofluoric acids may also be used in this relationship.

The fibrous silicon carbide is unaffected by treatment with acids.

The fibrous silicon carbide has been found by X-ray diffraction to be present in the beta modification having a cubic space lattice. At very high temperatures, this beta crystal form may undergo some modification to the alpha form. Silicon carbide fibers do not melt, but in an inert or reducing atmosphere are stable up to 2600° C. at which temperature silicon carbide decomposes.

The extremely fine fibers obtained in accordance with the present invention are of particular utility as a high temperature insulating material. The small diameter of the particles, i.e., particle diameters as small as 50 angstroms (corresponding to $1.9 \times 10^{-7}$ inches) makes it possible to felt or mat the individual fibers into a structure which is highly efficient as a thermal insulator, and is useful in high temperature ranges where practically no other materials are available. It has also been found that the individual fibers of silicon carbide obtained in the present invention have a high reflectance which block heat penetration because they scatter incoming infrared rays by diffusion reflectance.

The use of this material as a thermal insulator in the loose form as produced has been found to result in the substantial absence of shaking down or packing and the retention of desired insulating volumes, for example, in making an intricate shaped covering jacket for the use around various mechanical parts, such as jet burners employed in rockets. The settled density of the fibrous product may be as low as 0.5 lb. per cubic ft., although it is possible by mechanical compacting to obtain densities as great as 10 lbs. per cubic foot, or higher. This material may be subjected for brief periods to temperatures as high as 2600° C., although a preferred operating temperature in non-oxidizing atmosphere is up to 2000° C.

The present fibrous product is also readily "felted" to form a paper-like material. Such materials are produced by dispersing the fibers in water and withdrawing the water as in standard paper-making equipment, using vacuum equipment, centrifuging, etc.

The fibers of silicon carbide obtained in the present invention may be felted or matted into any desired shape and have been found to yield a form of inorganic "paper" which may be used for insulating purposes and which also possess a proper degree of capillarity so they may be written upon or printed with ink. If it is desired to make electric or thermal insulating batts or shaped forms, for example, in insulating intricate objects, the fibers may be felted from a water slurry and shaped to the desired form such as by the use of a screen preform from which the water is eliminated such as by conventional drying techniques, centrifugation, etc., to yield the desired object or shaped form. Such a material existing in the felted dry state is quite strong mechanically and is useful particularly in the medium temperature range such as from 500 to 1,800° C. For very high temperature applications, the shaped objects, as well as any other form of the fibrous silicon carbide, may be recrystallized by heating to a temperature of from 1,500 to 2,000° C. to yield a more massive product. Such an article of manufacture possesses desirable properties as a refractory, for example, as a crucible suitable for use in the operating temperature range of 1,000° C. to 2,000° C.

The fibers of silicon carbide obtained in the present invention are substantially insoluble in any mineral acids. The electrical properties of the fibrous form indicate that the material is a semiconductor as is indicated by the negative temperature coefficient of resistance. The energy gap value of this material is in the region of approximately 2 to 8 electron volts.

The fibers of silicon carbide as produced in the present invention are extremely strong. It has been shown that individual fibers have a tensile strength of the order of 10,000,000 p.s.i., which is further indication of the existence of the silicon carbide as a monocrystalline, covalent filament with a single axial screw dislocation. In comparison to pure iron "whiskers," such as have recently been produced, the strength of such high purity iron is only about 3,000,000 p.s.i.

The present form of fibrous silicon carbide exists as single crystals. This has been proved by the electron microscopic examination of the fibers which reveal electron diffraction lines next to the fibers, thus indicating the single crystal structure.

Figure 2:
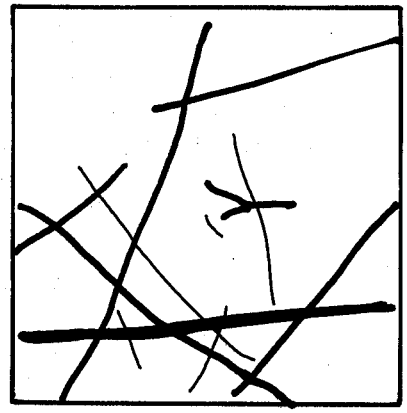

The drawings of the present application illustrate a magnified view of the product of the present invention as seen under the electron microscope. FIG. 1 at a magnification of 15,000 illustrates the longer forms of the present fibers of silicon carbide. In this drawing, the fibers have an average diameter of about 800 angstroms and a length of up to about 1,000,000 angstroms. The length/diameter ratio of the fibers of FIG. 1 ranges from about 1,000 to about 12,000. FIG. 2 at a magnification of 15,480X shows the smaller fibers of silicon carbide obtained in the practice of the present invention. The fibers shown in FIG. 2 have individual fiber lengths of about 1,000,000 angstroms and individual fiber diameters of about 6,000 angstroms, i.e., a length-diameter ratio of about 166.

The following examples illustrate specific embodiments of the present invention.

*Example 1*

The production of the fibrous form of silicon carbide was carried out utilizing separate sources of gaseous silicon monoxide and gaseous carbon monoxide. The silicon monoxide was produced in a separate furnace by heating a mixture of approximately equal weights of metallic silicon and silicon dioxide (washed sea sand). This mixture was heated to a temperature of about 2,000° C., at which temperature silicon monoxide was evolved as a gas. The stream of gaseous silicon monoxide was then led into a Vycor tube reactor which also contained a conduit for the introduction of carbon monoxide. External heating means were provided for this reactor using a series of electrical resistors to bring the reactor temperature to 1,300° C. The gas streams were maintained with a flow rate of about 3 parts by volume of carbon monoxide to 1 part by volume of silicon monoxide. A precipitation product resulting from the interaction of the two gas streams was found to be a pure white, fluffy, fibrous mass of silicon carbide fibers which deposited upon both the hot and cold parts of the reactor tube. The individual fibers were approximately 50,000 angstroms in length and about 6,000 angstroms in diameter.

Example 2

The production of fibrous silicon carbide was carried out in a porcelain tube located in a 2-zone furnace. The first zone was maintained at 1,950° C. and the second zone at 1,250° C. The charge located in the first zone consisted of a mixture of a commercial grade of silicon carbide and silicon dioxide (sand) in approximately equal proportions. This mixture was placed at the hottest point in the first zone and was found to evolve gaseous silicon monoxide. After the charge mixture had been brought up to equilibrium, the entire furnace was evacuated by means of suitable vacuum pumps until the pressure was below 100 microns of mercury. A slow flow of carbon monoxide was then admitted into the porcelain tube from an external source to maintain the non-condensable gas pressure at 100 microns with an excess of carbon monoxide over the amount required for the theoretical reaction between the silicon monoxide and carbon monoxide. The fibrous silicon carbide was deposited in the 1,250° C. zone of the furnace as a deposit growing radially inward along the length of the collection tube.

Example 3

In order to obtain an electronic grade of silicon carbide, the porcelain furnace used in Example 2 was charged with chemically pure elemental silicon in the first zone of the furnace. The silicon was oxidized at a temperature of 1,350° C. by passage of gaseous carbon monoxide over the elemental silicon with the resultant evolution of silicon monoxide. The temperature was regulated and the flow velocity of the carbon monoxide adjusted to a rate of 60 cc./min./inch$^2$ of exposed silicon surface to maintain the carbon monoxide at about 90% by volume of the total gas mixture with the remainder being silicon monoxide in the secondary reaction zone at 1,250° C. The fibrous silicon carbide was found to condense from the vapor phase upon the cooler portion of the furnace tube.

Example 4

In order to obtain silicon monoxide for the desired reaction with carbon monoxide, a two-zone furnace system as described in Example 1 was utilized in the present example. The primary zone of the furnace was charged with a mixture of an excess of carbon with silicon dioxide. This mixture was heated to a temperature of about 1,950° C., after which the furnace was evacuated to a pressure of about 100 microns of mercury pressure. A stream of carbon monoxide was then admitted to the secondary reaction zone. Silicon monoxide also entered the secondary zone from the primary part of the furnace containing the above-described charge. The secondary zone maintained at a temperature of about 1,200° C. then served as a collection area for the reaction product of the silicon monoxide and the carbon monoxide. The product was a pure white fibrous form of silicon monoxide.

The product obtained in the above examples was found to be a very fine, continuous, fibrous form of silicon carbide having a fiber length ranging from about 250 angstroms to 2,500,000,000,000 angstroms and with a fiber diameter ranging from 50 angstroms to 10,000,000,000 angstroms. In general, the ratio of fiber length to diameter was from about 5:1 to 50,000,000,000:1.

The fibrous product when subjected to chemical analysis was found to consist of a very pure form of silicon carbide without the production by the present process of any silicon oxycarbides.

In general, the fibrous silicon carbide of the present invention may used to improve the strength of shaped objects prepared from any continuous medium which can be reinforced, for example, metals, ceramics, and polymerized organic monomers. Examples of metals which are of particular utility include iron, titanium, molybdenum, vanadium, uranium, beryllium, aluminum, copper, and compounds and alloys thereof. The ceramic materials include the various oxide compositions, such as complex silicates used for the production of porcelain and other white ware. Examples of monomers which can be polymerized to obtain high strength articles having dispersed silicon carbide therein include phenolic resins (preferably beginning with a preliminary polymerized material), and other condensation polymers, e.g., nylon, vinyl resins such as polyvinyl chloride, acrylic monomers, such as methyl methacrylate, styrene, etc., and polymerized olefin hydrocarbons, such as polyethylene, natural and synthetic rubbers, and epoxys such as are based upon isocyantes.

The fibrous form of silicon carbide as produced in accordance with the present invention is of particular utility as a reinforcing material in the fabrication of articles of manufacture from metals, ceramics and organic plastics, such as polymerized organic monomers. For example, in reinforcing phenolic or epoxy resins, the present material may be dispersed in the liquid or semi-polymerized resin utilizing either the discrete fibers, or an aggregated form such as bats, e.g., the compressed and felted "paper" described above. Such reinforced resin is characterized by extreme strength as well as high temperature stability so that this material is suitable for use in making a nose cone for a missile, rocket, etc. Furthermore, a dimensionally stable structure is maintained when at high temperatures, the organic portion is burned out leaving a carbon residue dispersed in the original silicon carbide fibers.

The above-described shaped articles obtained by polymerizing a polymerizable organic monomer based upon a carbon compound, and having associated therewith fibrous silicon carbide which may be further improved in thermal refractory properties by decomposing the organic polymer. For example, a phenolic resin may be formed into any desired shape by incorporating from 10% to 90% by weight of fibrous silicon carbide with the B-stage phenolic resin. This mixture is then polymerized such as by heating in a mold to form an object of the desired shape. Such a shaped object is then heated either in the presence of air or in an inert atmosphere to decompose the organic polymer or resin. In this way, there is obtained a residual carbon skeleton associated with the fibrous silicon carbide to provide an object having extremely good refractory properties at high temperatures.

Example 5

The production of an electrically conducting plastic formed object by the incorporation therein of the fibrous form of silicon carbide was conducted by first preparing a phenol-formaldehyde resin ready for pressing. The dry mixture of the resin in an incompletely polymerized form was mixed with 1% by weight of the fibrous product as obtained by the method of Example 1 above. The fibrous silicon carbide thus employed was in a fluffy condition which had not been subjected to any compacting. The mixture was then placed into a heated mold and pressed at a temperature of about 250° F. The mold in this case was a nose cone for a missile.

The pressed, formed object of the polymerized phenolformaldehyde resin was found to be harder, more refractory, and more wear resistant because of the incorporation therein of the fibrous form of silicon carbide.

Example 6

The formation of a nose cone for a rocket was carried out by admixing 100 g. of fibrous silicon carbide in the "as produced" condition (i.e., containing about 1% by weight of microspheroids of silicon dioxide) together with 900 g. of a phenol-formaldehyde resin in the B-stage of partial polymerization. The mixture of the powdered resin, together with the fibrous silicon carbide, was then placed in a mold having the desired shape of a nose cone and subjected to 250° F. heating for a period of 5 minutes.

The shaped object thus obtained had a smooth finish and the desired configuration of a nose cone. In this form a highly useful object was obtained. The fabricated nose cone was subjected to the blast of a high velocity, high temperature oxy-acetylene flame. This simulated the conditions a nose cone would experience on re-entry to the atmosphere from space. Under these conditions, the phenolic resin was decomposed, although the nose cone retained its shape, because of the incorporation therein of the reinforcing fibrous silicon carbide. A skeletal structure remained despite the high temperature heating to provide an intimately bonded admixture of carbon from the phenolic resin together with the fibrous silicon carbide. The nose cone can readily be heated to a temperature of 2,500° C. for short periods without any deleterious effect upon the nose cone.

In the manufacture of high strength metal articles by casting from a shaped mold, the fibrous silicon carbide is either uniformly dispersed throughout the metal or applied to the surface of the mold to be taken up by the molten metal and concentrated at the external surface of the casting. In this latter process, the fibrous silicon carbide for mold facing is first dispersed in a liquid material, preferably water by suspending the fibers therein. In order to provide a stable suspension, the slip is usually prepared with the addition thereto of a suspending agent such as carboxymethylcellulose. If desired, a clay-like material such as bentonite may also be included in the slip. This slip containing the fibrous silicon carbide is then applied to the surface of the mold. The mold may be made of sand, a plastic-sand combination, a high melting point metal or a ceramic such as calcium sulfate and/or magnesium oxide. In this way, a substantial thickness of the fibrous silicon carbide is deposited upon some or all of the surfaces of the mold. When the molten metal is poured into the mold, the fibrous silicon carbide is dispersed in the metal but is concentrated in the external surfaces thereof. In this way, there is obtained a hardened and wear-resistant external surface of the metal.

Another fabrication method to produce metals strengthened by the fibrous silicon carbide is to deposit the desired metal upon the fibers and then shape or otherwise fabricate the mass of composite fibers to the desired form, for example, by powder metallurgical techniques such as pressing and sintering. For example, an unconsolidated loose mass of silicon carbide fibers is readily electroplated with copper, e.g., from 50% to 50,000% by weight of metal by electrodeposition. Other methods of applying a metal such as aluminum, iron, cobalt, nickel, tungsten, or molybdenum to the silicon carbide include electrodeless plating of a metal such as nickel from salts thereof and chemical reduction of various metal compounds such as nickel, carbonyl, tungsten, pentachloride, and aluminum acetoacetate using either liquid or vapor phase methods. The deposited metal is in exceedingly intimate contact with the base fibrous silicon carbide. When the composite mass of material is sintered or compressed, the metal becomes the continuous phase with the fibers of silicon carbide being dispersed throughout the metal as a reinforcing or dispersion hardening agent. In this way, the physical strength and also the high temperature properties of the metal are greatly improved.

In the use of the fibrous silicon carbide for reinforcing metals, the fibers may be dispersed in the metal matrices such as by addition to the molten metal. In this way, an extremely intimate dispersion may be obtained similar to the dispersion strengthening of metals. The sheet or paper form of aggregated fibrous silicon carbide is also of utility in the preparation of laminates and hard surfaces fabricated with various metals such as copper, die casting compositions, aluminum, iron and ferrous alloys. In this method of fabrication, the reinforcing sections of the fibrous silicon carbide as a bat, or in paper form are located along the face edges of a mold. Liquid metal is then poured into the mold with the result that the fibrous silicon carbide becomes dispersed within the metal, while being concentrated in the external surfaces of the molded metal objects. In this way, it is possible to hard-surface or strengthen the outer wearing areas, or any other desired section and to obtain a wear-resistant and hardened metal area.

In addition to the conventional metals, the use of combined metals in alloys and compounds is a part of the present invention. Ferrous alloys such as steel, e.g., stainless steel, are greatly improved in hardness by the addition of the present fibrous silicon carbide. Less common metals including titanium per se, or in combined form, e.g., titanium diboride, are of utility for this purpose. The silicon carbide fibers can also be beneficially incorporated into the refractory hard metal, such as borides, silicides, carbides, nitrides, and phosphides, which exist in metallic form or as compounds, such as silicon boride, molybdenum disilicide, titanium carbide, boron nitride, and boron phosphide. For example, a body formed of zirconium diboride containing 25% of the fibrous form of silicon carbide and fabricated by hot pressing was found to display vastly superior thermal shock properties in comparison to the zirconium diboride fabricated without the silicon carbide fibers.

*Example 7*

The introduction of fibrous silicon carbide as a wear-resistant surface in metal casting was shown in the casting of aluminum. Molten aluminum was poured into a rectangular mold, the walls of which had adhering thereto a layer of the "paper" form of fibrous silicon carbide. It was found that the fibrous silicon carbide was dispersed at the external molten surface of the metal and concentrated at the surface in the hardening of the aluminum. The surface was thereby hardened and provided with superior wear-resistant properties.

The term "ceramics" as employed herein refers to the inorganic oxides and combinations therein which are consolidated by heating to a high temperature. Thus, the conventional metal oxides and combined forms are of utility in the fabrication of shaped articles. For example, a sillimanite ($Al_2O_3 \cdot SiO_2$) body containing 10% of the fibrous form of silicon carbide is found to have a greater impact strength than the ordinary sillimanite without this additive.

Another example of a ceramic application is the use of combined oxides, e.g., 25% $SiO_2$+53% Kaolin ($Al_2O_3 \cdot 2H_2O \cdot 2SiO_2$), which is mixed in the wet state with 10% by weight of the "as produced" silicon carbide. When this is shaped and fired, an unusually hard porcelain is obtained.

The fibrous silicon carbide also serves to improve ceramic objects into which it is incorporated. For example, a porcelain slip containing dispersed fibrous silicon carbide, e.g., from 2% to 50% by weight is useful in making porcelain objects having improved electrical and thermal conductivity. Such shaped objects resulting from the firing of the clay ceramic ware is also characterized by improved physical strength, particularly in withstanding thermal shock and in increased tensile strength. In this way, it is possible to manufacture electrically conductive ceramic material. Such products may be used to dissipate static electricity and to serve as resistance heaters. Another example of an improved ceramic product is a shaped clay object such as a high temperature bearing containing dispersed fibrous silicon carbide, for example, in the proportion of from 2% to 50% by weight. Such objects have greater strength than can be obtained from ceramics alone or from solid silicon carbide. The products also have superior thermal conductivity relative to clay.

In the forming of ceramic objects, for example, electrical heating elements and other analogous electrical equipment by conventional methods, such as slip casting, pressing extrusion, etc., the fibrous silicon carbide is readily added to the raw mixture of the desired ceramic product, such as a clay or other single and combined oxide base. In this way, there is obtained a uniform dispersion of the fibrous silicon carbide throughout the ceramic material. In this relationship, the proportion of the fibrous silicon carbide which is employed may be varied widely, for example, from 1% to 95% by weight. The lower proportions are of particular advantage in controlling the structure and the physical strength of the ceramic article such as a furnace crucible, while the higher range of proportions are advantageous in improving the electrical conductivity and hot strength, i.e., the refractory properties of the ceramic material, particularly when it is desired to improve the electrical conductivity of the material at very high temperatures. For example, in the formation of a furnace resistance heating element, 90% by weight of the fibrous silicon carbide is bonded by a silica or other suitable crude material which is then formed by conventional means such as by extrusion or casting. The product thus obtained is superior over the conventional heating elements with regard to impact strength, particularly at very high temperatures.

In view of the insulating thermal reflective properties of the fibrous form of silicon carbide, this material is also of utility as a heat-reflective coating, particularly for high temperature applications. The material may also be utilized in the manufacture of protective clothing, such as firemen's uniforms. Since the fibrous product has a very low bulk density, it is useful as an accoustical insulation and may, therefore, serve as a component in insulating plaster and fabricated wall boards. Another field of use for the fibrous material is as a catalyst support. In this relationship, the bulky "as produced" fibers may be used with a catalytic component such as molybdenum, silver, or platinum compounds or metals dispersed thereon, such as by spraying from an aqueous solution, and reducing. However, another way in which catalysts may be fabricated is by introducing the catalytic salts of components in the water which is used to felt the individual fibers into a sheet of paper or other form into which the catalyst product is to be fabricated.

In addition to the above uses of the fibrous form of silicon carbide, this material is of unusual utility as a filter to remove solid particles from high temperature gases. In this application, the fibers of silicon carbide are felted to form bats, cartridges, or other shaped forms. The bulk density of the bats can be varied to accommodate the removal of particles of various sizes from the hot gas stream. As produced and collected, the fluffy fibers have a bulk density of about 0.5 lb./cu. ft. However, compression of the fibers yields a porous sheet or other shaped filter which has an increased density, and can approach the theoretical density of about 200 lb./cu. ft. The filters described herein are not affected by combustion gases so that they may be used at 1000° C. to filter solid particles from furnace effluent streams such as in metallurgical processes. The fibrous silicon carbide may also be used because of its chemical inertness to filter radio-active particles from gas and liquid streams in atomic reactors.

*Example 8*

A fibrous form of silicon carbide was prepared by beginning with silicon carbide and silica as the starting materials.

A graphite boat was charged with a mixture of 1.219 grams of $SiO_2$ (finely divided amorphous silica) and 6.485 grams of silicon carbide (600 mesh). The loaded boat was then placed in an electric tube furnace provided with a vacuum control system. The furnace was heated to 1350° C. and the pressure maintained at 40–100 microns for 65 hours. At the end of this time, the furnace was opened and the product (0.1187 gram) found to be a porous, columnar ring composed of an agglomeration of fibrous or thin columnar hair-like pieces. The blue-gray product condensed from the gas phase at the beginning of the cold zone of the furnace. The fibers were analyzed by X-ray diffraction, and found to be beta (cubic) crystalline silicon carbide.

It is also an embodiment of the invention to prepare high strength articles of manufacture for high temperature service comprising a skeletal structure of the present fibrous form of silicon carbide with a reinforcing agent in intimately bonded admixture therewith, the said reinforcing agent being selected from the group consisting of carbon metals and oxides. Suitable metals for this purpose include refractory metals such as nickel, cobalt, tungsten, molybdenum, and the like. Suitable oxides include zirconia, thoria, silica, and the like.

The carbon may be introduced into the shaped articles as a resinous material together with fibrous silicon carbide, which composite article is subjected to a high temperature, for example, a phenolformaldehyde resin or other carbon containing plastic heated to a temperature of 1,000° C., in order to transform the carbon content to an intimately admixed form of fine particles creating a reinforcing structure with the skeletal fibrous silicon carbide. When metals such as tungsten are employed as the reinforcing agent with the fibrous silicon carbide, the metals may be introduced as finely divided powders which are consolidated with the fibrous silicon carbide by conventional means such as hot pressing, sintering, etc. Oxide materials may be incorporated by spraying, pressing, or chemical reduction.

Another source of carbon in the present composite compositions with the fibrous silicon carbide is the type of carbon known as pyrolytic graphite resulting from the elemental decomposition of gaseous hydrocarbons such as methane, ethane, propane, butane, benzene, toluene, etc. In carrying out this process to obtain a composite product, a shaped object, such as a nose cone, is first provided as a mandrel of molybdenum or other temperature stable material. This mandrel is the base upon which the pyrolytic graphite is deposited, for example, by thermally decomposing methane at 2,000°. The resultant pyrolytic graphite coating consisting of oriented graphite platelets in contrast to the conventional randomly oriented graphite. The pyrolytic graphite is the base upon which the fibrous silicon carbide is added, such as by placing thereon a felted shell or "paper" of the aggregated fibrous silicon carbide. The layer of the fibrous silicon carbide may also be provided by painting the pyrolytic graphite with a dispersion of fibrous silicon carbide in a medium such as ethanol, water, or benzene, which medium is subsequently volatilized or burned off. Multiple layers or laminates can be formed in this way with the pyrolytic graphite bonding the silicon carbide fibers to give composite coatings which are characterized by unusually low thermal conductivity in the direction normal to the planes of the pyrolytic graphite, as well as extreme resistance to corrosion.

*Example 9*

The production of the fibrous form of silicon carbide was carried out utilizing separate sources of gaseous silicon monoxide and gaseous carbon monoxide. The silicon monoxide was produced in a separate furnace by heating metallic silicon and carbon dioxide, which gas was passed over the silicon. The metallic silicon was contained in a mullite boat in a tubular furnace maintained at about 1400° C. while the carbon dioxide was passed over the charge of 100 grams of silicon employing a carbon dioxide flow rate of 100 cc. per minute. The reaction between silicon and carbon dioxide resulted in the production of gaseous silicon monoxide which was then led into a Vycor tubular reactor which also contained a conduit for the introduction of carbon monoxide. External heating means were provided for this reactor using a series of electrical resistors to bring the reactor temperature to 1150° C. The respective gas streams entering this reaction zone were maintained with a flow rate of about 3 parts by volume of carbon monoxide to 1 part by volume of silicon monoxide. The Vycor tubular reactor also contained a centrally located thermocouple tube of mullite, and was provided with a series of thermocouples in order to measure the temperature profile through the reaction zone. After stable conditions had been reached, it was found that long fibers of silicon carbide were deposited radially upon the thermocouple tube located in the center of the reaction zone with the fibers extending outward to the external walls of the reaction vessel. The fibrous product was found to be a pure white fluffy mass which deposited in predominant proportion at the central portion of the reaction zone having a collection temperature area of from 1100° C. to 1300° C. However, it was observed that the effective temperatures range from 1050° C. to 1350° C. The individual fibers were approximately 120,000,000 angstroms in length and about 6,000 angstroms in diameter.

The silicon monoxide which is employed in the present gas phase reaction may be obtained by conventional means such as the primary reaction of elemental silicon, or optionally, ferrosilicon, with carbon monoxide. Other methods for the production of the silicon monoxide are the reduction of silicon dioxide with carbon to obtain silicon monoxide. Another process is the reaction of elemental silicon with carbon dioxide to yield gaseous silicon monoxide.

*Example 10*

A variation of the process of the present invention was carried out by conducting a once-through process without the necessity of intermediate injection of carbon monoxide. This was accomplished by conducting the formation of silicon monoxide at a high rate of speed by the reaction of elemental silicon with carbon monoxide. The metallic silicon (100 grams) was contained in a mullite boat in a tubular furnace maintained at about 1400 C. while carbon monoxide was passed over the charge, employing a gas flow rate of 500 cc. per minute. Under these reaction conditions, the carbon monoxide was only partially transformed to silicon monoxide so that about 75% by volume of carbon monoxide was present as unreacted material at this stage. However, by continuing the passage of the gas mixture of silicon monoxide and carbon monoxide further through the tubular furnace at 1400° C., the carbon monoxide reacted with all of the silicon monoxide to yield the desired fibrous, monocrystalline silicon carbide which deposited on the walls and the central solid ceramic core located at the symmetrical center of the reactor tube. The temperature in the collection zone was at about 1200° C.

*Example 11*

The use of carbon dioxide as a gaseous starting material is shown in the present example based upon the reaction of elemental silicon with carbon dioxide to yield a gaseous mixture of silicon monoxide and carbon monoxide in approximately 1 equimolar proportion. The metallic silicon was contained as 100 grams of fine powder placed in a mullite boat in a tubular furnace maintained at about 1500° C., while the carbon dioxide was passed over the charge at a flow rate of 100 cc. per minute. The reaction conditions were found to yield an equilibrium mixture with the conversion of all of the carbon dioxide to a gaseous mixture of silicon monoxide and carbon monoxide in equimolar proportions. This mixture was then passed further through the tubular reactor and the fibrous silicon carbide precipitated on the walls of the cooler section of the reactor tube at a temperature of about 1000° C. In general, the temperature of the collection zone has been found to be desirably maintained in the range of from 1100° C. to 1300° C., or more broadly from 1050° to 1350° C. The silicon carbide fibers were deposited radially and were found to have a length of about 100,000,000 angstroms and diameter of about 5,000 angstroms.

Another method of obtaining the desired silicon monoxide is by reacting elemental silicon with $CO_2$. This gives $SiO+CO$, and may be controlled to operate with any desired proportions within the range defined below, such as 25% by volume, of CO relative to 100% of the total gas stream of $SiO+CO$.

In carrying out this process, a shaped object such as a nose cone is formed from pyrolytic graphite, for example, by pyrolyzing methane at 2000° C. in the presence of a molybdenum or other temperature stable mandrel having the shape of the desired nose cone. The resultant pyrolytic graphite coating consists of oriented graphite platelets in contrast to the conventional randomly oriented graphite.

The composite structure with fibrous SiC is then obtained by coating the previously prepared pyrolytic graphite object with a layer of fibrous SiC such as by felting, attaching a "paper" of the fibers or painting with a medium which is subsequently volatilized or burned off, etc. Multiple layers or laminates can be formed in this way, with the pyrolytic graphite bonding the SiC to give composite coatings having unusually low thermal conductivity and extreme resistance to corrosion.

What is claimed is:

1. Process for the production of a fibrous form of silicon carbide by the reaction of silicon monoxide and carbon monoxide in vapor phase.

2. Process for the production of a fibrous form of silicon carbide by the reaction of silicon monoxide and carbon monoxide in vapor phase at a temperature in the range of from 1100° C. to 2200° C. and in which volume percentage of carbon monoxide, in the vapor phase, ranges between 25% and 99.99%.

3. Process for the production of a fibrous form of silicon carbide by the reaction of silicon monoxide and carbon monoxide in vapor phase to produce a monocrystalline form of silicon carbide having a fibrous structure, and collecting the said fibrous product and thereafter contacting the said fibrous product with hydrofluoric acid to dissolve minor proportions of silicon impurities while leaving the said fibrous silicon carbide as the residual product.

4. Process for the production of a fibrous form of silicon carbide by the reaction of silicon monoxide and carbon monoxide in vapor phase at a temperature in the range of from 1100° C. to 2200° C. to produce a monocrystalline form of silicon carbide having a fibrous structure, and collecting the said fibrous product and thereafter contacting the said fibrous product with a mixture of hydrofluoric acid and nitric acid to obtain the fibrous silicon carbide as the residual insoluble product.

5. Process for the production of a fibrous form of silicon carbide which comprises contacting elemental silicon with carbon dioxide at a temperature in the range of from 1000° C. to 2000° C. to yield silicon monoxide and carbon monoxide in approximately equimolar proportions in vapor phase at a temperature in the range of from 1100° C. to 2200° C., to produce a mono-crystalline form of silicon carbide having a fibrous structure, and collecting the said fibrous product.

6. Process for the production of a fibrous form of silicon carbide which comprises contacting elemental silicon with carbon dioxide at a temperature in the range of from 1000° C. to 2000° C. to yield silicon monoxide and carbon monoxide in approximately equimolar proportions in vapor phase at a temperature in the range of from 1100° C. to 2200° C., to produce a mono-crystalline form of silicon carbide having a fibrous structure, collecting the said fibrous product, and thereafter contacting the said fibrous product with hydrofluoric acid to obtain the fibrous silicon carbide as the residual insoluble product.

7. Process for the production of a fibrous form of silicon carbide which comprises contacting elemental silicon with carbon dioxide at a temperature in the range of from 1000° C. to 2000° C. to yield a mixture of silicon monoxide and carbon monoxide and thereafter contacting the said mixture with further carbon monoxide in vapor phase at a temperature in the range of from 1100° C. to 2200° C., the proportions of the total silicon monoxide and the carbon monoxide in admixture therewith being from 50% to 99.99% by volume of carbon monoxide relative to 100% by volume of the total gas stream to produce a monocrystalline form of silicon carbide having a fibrous structure, and collecting the said fibrous product.

8. Process for the production of a fibrous form of silicon carbide which comprises contacting elemental silicon with carbon dioxide at a temperature in the range of from 1000° C. to 2000° C. to yield a mixture of silicon monoxide and carbon monoxide and thereafter contacting the said mixture with further carbon monoxide in vapor phase at a temperature in the range of from 1100° C. to 2200° C., the proportions of the total silicon monoxide and the carbon monoxide in admixture therewith being from 50% to 99.99% by volume of carbon monoxide relative to 100% by volume of the total gas stream to produce a monocrystalline form of silicon carbide having a fibrous structure, collecting the said fibrous product, and thereafter contacting the said fibrous product with hydrofluoric acid to obtain the fibrous silicon carbide as a residual insoluble product.

9. Process for the production of a fibrous form of silicon carbide which comprises contacting elemental silicon with carbon monoxide at a temperature of from 1000° C. to 2000° C. at a rate such that only a part of the carbon monoxide reacts with the silicon to produce a gaseous mixture of silicon monoxide and carbon monoxide, and thereafter contacting the said mixture in vapor phase at a temperature in the range of from 1100° C. to 2200° C., the proportions of the said silicon monoxide and the said carbon monoxide in gas phase at the time of contacting being from 25% to 99.99% by volume of carbon monoxide relative to 100% by volume of the total gas stream, to produce a monocrystalline form of silicon carbide having a fibrous structure, and collecting the said fibrous product.

References Cited by the Examiner

UNITED STATES PATENTS

| | | | |
|---|---|---|---|
| 1,104,384 | 7/1914 | Potter | 23—204 |
| 1,331,435 | 2/1920 | Hutchins. | |
| 1,488,311 | 3/1924 | Brockbank. | |
| 1,504,547 | 8/1924 | Egerton | 18—55 |
| 2,641,525 | 6/1953 | Walter et al. | 22—192 |
| 2,807,856 | 10/1957 | Frosck | 25—156 |
| 2,862,795 | 12/1958 | Lowe | 23—208 |
| 2,871,152 | 1/1959 | Tobin | 154—43 |
| 2,882,568 | 4/1959 | Leaberry et al. | 22—139 |
| 2,897,572 | 8/1959 | Hansen | 25—156 |
| 2,913,313 | 11/1959 | Schroll | 23—208 |
| 2,952,040 | 9/1960 | Phillips | 18—55 |

OTHER REFERENCES

Iley et al.: Article in Chemical Society Journal, 1948, pp. 1362–1366.

Silicon Carbide, O'Connor et al., Pergamon Press (1960), pp. 78–82.

MAURICE A. BRINDISI, *Primary Examiner.*

CARL F. KRAFFT, *Examiner.*